(12) United States Patent
Lohani et al.

(10) Patent No.: US 11,575,596 B1
(45) Date of Patent: Feb. 7, 2023

(54) IDENTIFYING AN INGRESS ROUTER OF A FLOW IN INTER-AS VPN OPTION-C NETWORKS WITH VISIBILITY IN ONE AS

(71) Applicant: Ciena Corporation, Hanover, MD (US)

(72) Inventors: Vaibhav Lohani, Kharadi (IN); Roopesh Palasdeokar, Dhankawadi (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/723,934

(22) Filed: Apr. 19, 2022

(30) Foreign Application Priority Data

Mar. 7, 2022 (IN) .............................. 202211012245

(51) Int. Cl.
*H04L 45/00* (2022.01)
*H04L 45/24* (2022.01)
*H04L 43/062* (2022.01)
*H04L 43/045* (2022.01)
*H04L 12/46* (2006.01)

(52) U.S. Cl.
CPC .......... *H04L 45/38* (2013.01); *H04L 12/4641* (2013.01); *H04L 43/045* (2013.01); *H04L 43/062* (2013.01); *H04L 45/24* (2013.01)

(58) Field of Classification Search
CPC ..... H04L 45/38; H04L 45/24; H04L 12/4641; H04L 43/045; H04L 43/062
See application file for complete search history.

(56) References Cited

U.S. PATENT DOCUMENTS

| | | | |
|---|---|---|---|
| 8,422,502 B1 | 4/2013 | Alaettinoglu et al. | |
| 8,611,359 B1 * | 12/2013 | Kompella | H04L 45/04 370/401 |
| 9,026,674 B1 | 5/2015 | Kanna et al. | |
| 10,104,139 B2 * | 10/2018 | Kebler | H04L 65/611 |
| 10,523,631 B1 * | 12/2019 | Wagner | H04L 12/4633 |
| 10,623,322 B1 * | 4/2020 | Nallamothu | H04L 45/64 |
| 10,630,581 B2 * | 4/2020 | Paul | H04L 45/52 |
| 10,715,419 B1 * | 7/2020 | Suryanarayana | H04L 12/4641 |
| 10,887,225 B1 * | 1/2021 | Chan | H04L 45/507 |
| 2007/0097974 A1 * | 5/2007 | Ward | H04L 45/04 370/465 |
| 2016/0050125 A1 * | 2/2016 | Mattson | H04L 41/0806 709/225 |
| 2016/0127454 A1 * | 5/2016 | Maheshwari | H04L 41/0803 709/223 |
| 2016/0248663 A1 * | 8/2016 | Patel | H04L 45/12 |
| 2016/0359728 A1 * | 12/2016 | Ficara | H04L 45/02 |
| 2018/0109450 A1 * | 4/2018 | Filsfils | H04L 45/04 |
| 2018/0191612 A1 * | 7/2018 | Subramanian | H04L 45/306 |
| 2018/0351862 A1 * | 12/2018 | Jeganathan | H04L 45/02 |

(Continued)

*Primary Examiner* — Blake J Rubin
(74) *Attorney, Agent, or Firm* — BarattaIP PLLC; Lawrence A. Baratta, Jr.

(57) ABSTRACT

Systems and methods include detecting whether a monitored network has a unique configuration; responsive to the unique configuration, determining an ingress point for flow samples; and utilizing the determined ingress point for the flow samples to generate a traffic report for the monitored network. The unique configuration is an inter-Autonomous System (AS) option-C Virtual Private Network (VPN) network where control and data planes are asymmetric. The approach provides traffic projection based on the flow samples with the asymmetric flows.

19 Claims, 4 Drawing Sheets

(56) References Cited

U.S. PATENT DOCUMENTS

| | | | |
|---|---|---|---|
| 2018/0351863 A1* | 12/2018 | Vairavakkalai | H04L 45/02 |
| 2018/0359323 A1* | 12/2018 | Madden | H04L 67/51 |
| 2018/0367409 A1* | 12/2018 | Zhang | H04L 41/5003 |
| 2019/0334814 A1* | 10/2019 | Peng | H04L 45/22 |
| 2019/0394066 A1* | 12/2019 | Lin | H04L 45/245 |
| 2021/0218682 A1* | 7/2021 | Ceccarelli | H04L 45/28 |
| 2021/0273827 A1* | 9/2021 | Vairavakkalai | H04L 12/4641 |
| 2021/0306256 A1* | 9/2021 | Ward | H04L 45/04 |
| 2021/0328906 A1* | 10/2021 | Peng | H04L 45/02 |
| 2022/0029911 A1* | 1/2022 | Zhang | H04L 45/745 |
| 2022/0345438 A1* | 10/2022 | Mishra | H04L 69/325 |

* cited by examiner

IDENTIFYING AN INGRESS ROUTER OF A FLOW IN INTER-AS VPN OPTION-C NETWORKS WITH VISIBILITY IN ONE AS

FIELD OF THE DISCLOSURE

The present disclosure generally relates to networking. More particularly, the present disclosure relates to systems and methods for identifying an ingress router of a flow in inter-AS VPN option-C networks with visibility in one AS.

BACKGROUND OF THE DISCLOSURE

An approach for configuring inter-AS services and inter-AS VPNs is known as inter-AS option-C. This approach is described in RFC 4364-BGP/MPLS IP Virtual Private Networks (VPNs) (February 2006), the contents of which are incorporated by reference herein in their entirety. Inter-AS option-C describes an approach by which a Service Provider may use an IP backbone to provide IP Virtual Private Networks (VPNs) for its customers. This approach uses a "peer model", in which the customers' edge routers (CE routers) send their routes to the Service Provider's edge routers (PE routers); there is no "overlay" visible to the customer's routing algorithm, and CE routers at different sites do not peer with each other. Data packets are tunneled through the backbone, so that the core routers do not need to know the VPN routes.

Commonly-assigned U.S. Pat. No. 8,824,331, issued Sep. 2, 2014, and entitled "System and method for identifying an ingress router of a flow when no IP address is associated with the interface from which the flow was received," the contents of which are incorporated by reference herein in their entirety, describes an ingress PE heuristic approach which uses the originator of L3VPN routes towards the traffic source and within the same VPN service to identify the ingress router. One particular assumption here is that the control plane and data plane paths are symmetric. The knowledge of the ingress router is critical for deriving traffic reports, matrices, etc., such as for traffic engineering.

However, the approach described in U.S. Pat. No. 8,824,331 does not work with inter-AS option-C. This is because the L3VPN route is learned via a different path from the traffic, thereby wrongly identifying originators as the ingress routers (PE).

BRIEF SUMMARY OF THE DISCLOSURE

The present disclosure relates to systems and methods for identifying an ingress router of a flow in inter-AS VPN option-C networks with visibility in one AS. The approach described herein is critical to accurately project traffic for inter-AS VPN option-C networks.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include detecting whether a monitored network has a unique configuration; responsive to the unique configuration, determining an ingress point for flow samples; and utilizing the determined ingress point for the flow samples to generate a traffic report for the monitored network.

The unique configuration can be an inter-Autonomous System (AS) option-C Virtual Private Network (VPN) network where control and data planes are asymmetric. The unique configuration can include some Layer 3 Virtual Private Network (VPN) (L3VPN) routes learned from an adjacent Autonomous System (AS) connected to the monitored network having an originator attribute that points to any of a Provider Edge (PE) node and routing gateway in the monitored network that is wrongly identified.

The detecting can be based on originators, including any of Provider Edge (PE) nodes and routing gateways, for some Layer 3 Virtual Private Network (VPN) (L3VPN) routes lacking Virtual routing and forwarding table (VRF) for corresponding services. The detecting can be based on some Layer 3 Virtual Private Network (VPN) (L3VPN) traffic entering the monitored network at an Autonomous System Border Router (ASBR).

The determining can include following Layer 3 Virtual Private Network (VPN) (L3VPN) traffic in a reverse direction. The determining can include searching next-hops of Layer 3 Virtual Private Network (VPN) (L3VPN) routes within local prefixes advertised by protocols used to setup transport tunnels. The steps can further include obtaining the flow samples from the monitored network. The steps can further include correlating a topology of the monitored network with paths for the flow samples. The traffic report can be a traffic projection based on the flow samples.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The following acronyms are used herein

| | |
|---|---|
| AS | BGP Autonomous System |
| ASBR | AS Border Router |
| BGP | Border gateway protocol (Routing protocol) |
| EBGP | External BGP (Routing protocol) |
| ISIS | Intermediate System to Intermediate System (Routing protocol) |
| IP | Internet Protocol |
| MPLS | Multiprotocol Label Switching |
| L3VPN | Layer 3 Virtual Private Network service based on MP-BGP and IP/MPLS |
| LSP | Label switched path |
| PE | Provider Edge router |
| RD | Route Distinguisher |
| RG | Routing gateway for exchanging BGP routes externally and learning external routes. |
| RR | Route Reflector for BGP routes |
| VRF | Virtual routing and forwarding table |
| MP-EBGP | Multi-protocol External BGP |

The present disclosure relates to systems and methods for identifying an ingress router of a flow in inter-AS VPN option-C networks with visibility in one AS. The approach described herein is critical to accurately project traffic for inter-AS VPN option-C networks.

Network Monitoring, Analysis, and Planning System/Software

Figure 1:
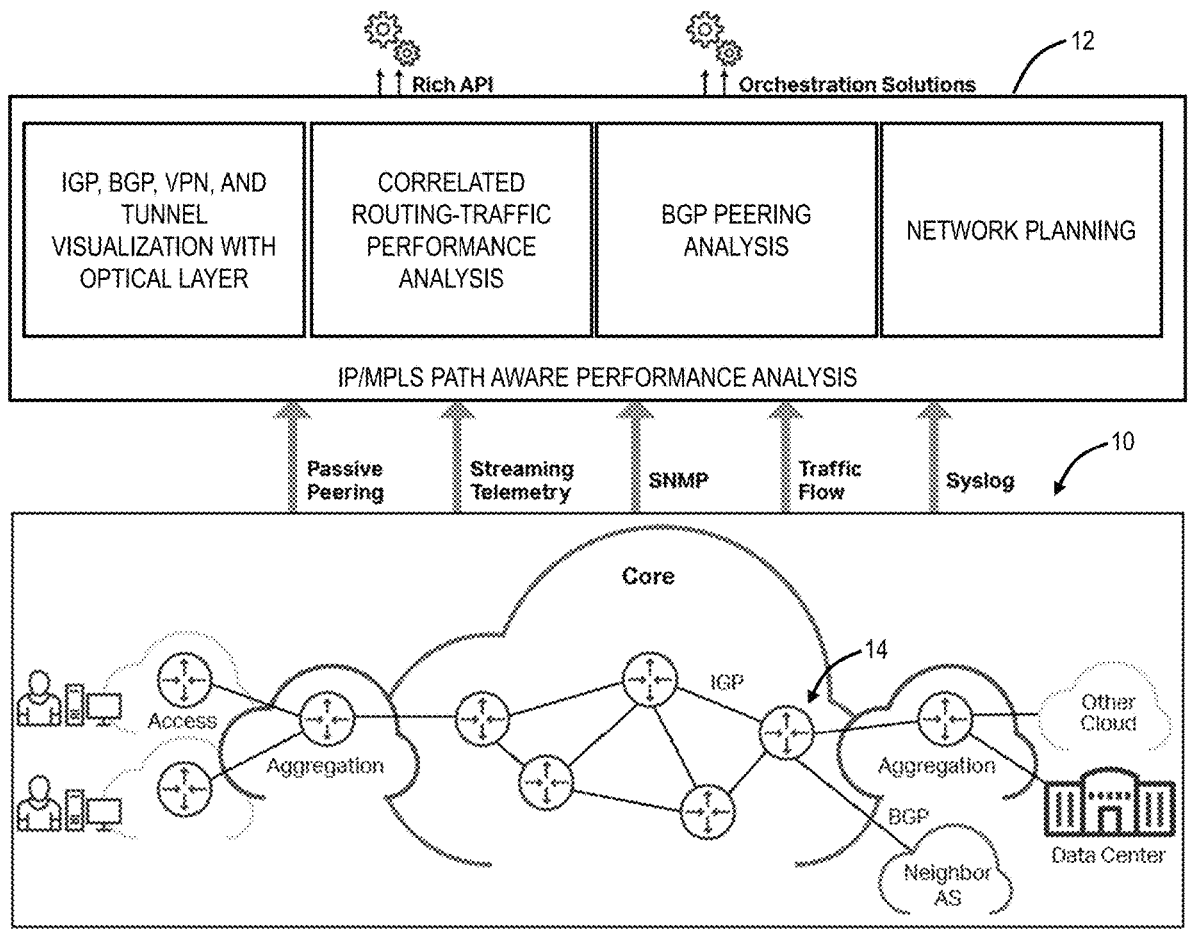
FIG. 1 is a diagram of an IP/MPLS network connected to a monitoring system.

FIG. 1 is a diagram of an IP/MPLS network 10 connected to a monitoring system 12. The IP/MPLS network 10 can include various network elements 14 from multiple vendors, in multiple domains or AS's, with thousands of routing paths—each carrying myriad number of critical services. The IP/MPLS network 10 needs analytics to provide informed decision-making and enable faster planning, activation, assurance, and troubleshooting of IP/MPLS services.

The monitoring system 12 can include a server, cluster of servers, cloud-based service, etc. that is connected to the IP/MPLS network 10 via any of passive peering, receiving streaming telemetry, via Simple Network Management Protocol (SNMP), via traffic flow (e.g., NetFlow/sFlow), via syslog, etc. The monitoring system 12 is configured to perform path aware performance analysis and can include visualizations (e.g., IGP, BGP, VPN, and/or tunnels along with the optical layer), correlated routing-traffic performance analysis, BGP peering analysis, and network planning. The monitoring system 12 is used by Service Providers and Enterprises to manage their IP/MPLS networks.

The monitoring system 12 gains visibility into IP/MPLS network by establishing peering with small set of IP devices—to discover the control plane of the IP/MPLS network setup by the dynamic protocols (BGP and IGP), and to discovers the MPLS service/transport configuration, their operational state and other static configuration by periodically exploring the devices. With the discovered information, the monitoring system 12 forms a multi-protocol model of the IP/MPLS network and generates various reports representing state of the network. This model and reports are useful for monitoring and analyzing the network 10.

The routing-traffic performance analysis correlates the discovered IP/MPLS network with strategically exported NetFlow/sFlow traffic samples from a small set of nodes, to generate network-wide multi-dimensional traffic reports/ matrices. NetFlow/sFlow traffic samples can be exported to the monitoring system 12 by the nodes. The monitoring system 12 then uses its multi-protocol network model to compute the exact data plane path of that flow sample in the network 10. Then, various traffic reports are generated using the flow samples and their computed path.

The recommended NetFlow/sFlow traffic sample collection points are the ingress edge nodes of the network 10, since the path from that point on can then be computed deterministically by the monitoring system 12. But in cases where flow samples are collected within the network core, the monitoring system 12 attempts to find the ingress point of that flow sample, to get complete knowledge of this path.

U.S. Pat. No. 8,824,331

U.S. Pat. No. 8,824,331 describes a heuristic algorithm that finds the ingress PE and VRF of an L3VPN flow sample collected in the core of the network.

The operating principle of that heuristic algorithm is— a) Use the L3VPN route(s) towards the source of the traffic, advertised within the same VPN service as the traffic, to find ingress PE candidates.

b) The ingress PE candidates are the originators of L3VPN routes towards the source of the traffic.

c) Correlate the topology and the paths from the candidate Ingress PEs to reduce the candidate set of possible Ingress PEs.

Inter-AS Option-C VPN Network

Figure 2:
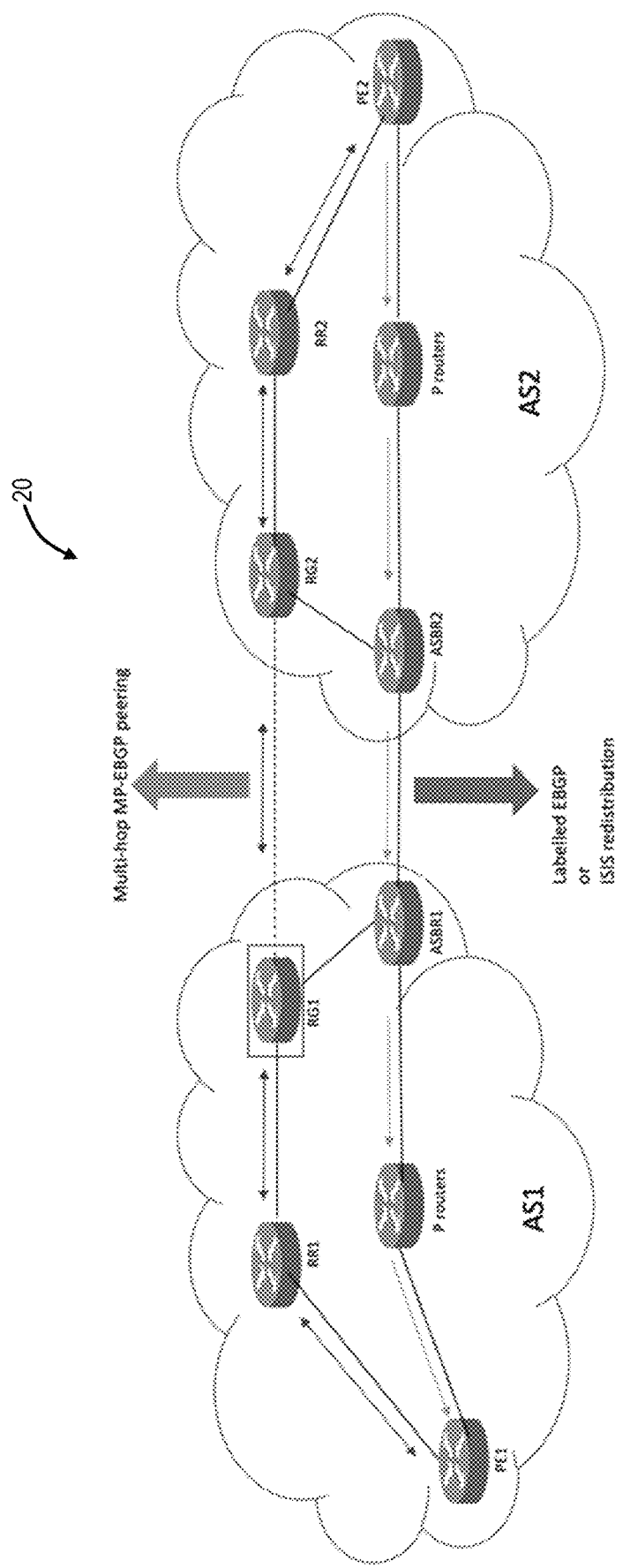
FIG. 2 is a network diagram of an inter-AS option-C VPN network with two AS's.

FIG. 2 is a network diagram of an inter-AS option-C VPN network 20 with two AS's, AS1, AS2. The AS1 includes a PE1, RR1, various intermediate P routers, a RG1, and ASBR1. The AS2 includes a PE2, RR2, various intermediate P routers, RG2, and ASBR2. The inter-AS option-C VPN network 20 configuration works as follows— a) A L3VPN service provided to the customer uses the underlay of two or more BGP AS's, AS1, AS2.

b) The L3VPN routes are shared between the AS1, AS2 using multi-hop MP-EBGP, such as shown in the network 10 between the RG1, RG2.

c) The end-to-end LSPs are set up between PEs across the AS1, AS2, using labeled EBGP or ISIS redistribution at the ASBRs.

d) The Next-hop attribute of L3VPN routes are not changed at any stage of their advertisement. The L3VPN traffic following these routes uses the end-to-end LSPs to reach the next-hop which is a PE in adjacent AS.

For the formation of end-to-end LSPs, the PE loopback addresses label bindings are advertised using LDP or RSVP-TE individually in both the AS1, AS2. The ASBRs in both the AS1, AS2 then exchange the PE loopback addresses using either Labeled EBGP or ISIS redistribution.

The other AS then has following options— i) Distribute those routes to only the PEs with the AS, using labeled-IBGP (BGP-LU4).

ii) Use LDP to advertise the route to either only the PEs (TLDP) or to the complete topology.

iii) Use IGP to advertise the route to complete topology.

For an example using the IGP case iii)—the PE2 loopback address is first learned within AS2 using some IGP protocol. PE2 shares the label binding for that address (FEC) with P, and P shares the subsequent label binding with ASBR2. ASBR2 shares the PE2 loopback route with a label binding with ASBR1 using labeled EBGP or multi-instance ISIS redistribution. ASBR1 announces the PE2 loopback address prefix in the complete AS1.

The following example explains VPNv4 route sharing between the PEs, by taking the example of VPNv4 routes shared by PE2 to PE1. VPNv4 routes are shared from PE2 to the Route reflector RR2, with the next hop being loopback address of the PE2. RR2 shares the route with Routing gateway RG2, which is one of its clients. RG2 shares the route with RG1 using a multi-hop EBGP peering. Although the route is shared over a EBGP peering, the next hop of the route is not changed, and still points to PE2 loopback. RG2 shares the route with Route reflector RR1, which in turn shares it with its client PE1. A similar mechanism is followed while sharing VPNv4 routes from PE1 to PE2.

The important thing to note here is that the traffic does not get forwarded through the routing gateways, i.e., the forwarding path is not same the path through which routes are exchanged.

The following is an example that explains the packet forwarding of packets from PE2 to PE1. PE2 receives a packet from a CE with a destination address that is advertised by PE1, in the same customer domain (i.e., Import-Export route targets match) PE2 follows the VPNv4 route advertised by PE1, which has next hop of PE1 loopback. So, PE2 recurses and now follows PE1 loopback. Since the PE1 loopback route was advertised using IGP in AS2, the packet reaches ASBR2 following IGP route for PE2 loopback announced by ASBR2. ASBR2 has a labeled BGP or ISIS route for PE1 loopback address, which points to ASBR1. At ASBR1, the packet follows the label switched path to PE1 loopback setup by LDP.

Problem with the Inter-AS Option-C VPN Network

In simple cases, the multi-hop MP-EBGP sessions to exchange EBGP routes are setup between the PEs of different AS's, i.e., there is a full mesh of multi hop EBGP peering between PEs across AS's. In larger networks, for scalability purposes, route reflectors (RR) and routing gateways (RG) can be used, as is illustrated in FIG. 2.

The monitoring system 12 learns BGP routes by establishing IBGP peering with either PEs or routing gateways, depending on which of the above configuration is used. While distributing EBGP routes via IBGP to the monitoring system 12, the peer (PE or routing gateway) changes the originator attribute of the route to itself.

Since the monitoring system 12 has visibility into the BGP routes of only one AS, actual L3VPN routes, originated by PEs in adjacent AS, are not known. This leads to a situation where, for an L3VPN route learned from the adjacent AS, the originator attribute in it points to either a routing gateway or a PE within the monitored AS, and the next-hop points to a PE in the adjacent AS. Due to this, the current heuristic algorithm falls inadequate and wrongly identifies the routing gateway or PE in the monitored AS, as the ingress ASBR.

In the example of FIG. 2, the monitoring system 12 records only one of the AS (AS1 in FIG. 2). NetFlow collection is configured on the ASBR, core routers and CE-PE links. Upon receiving a VPN flow at the ASBR or core router, we try to find the ingress PE and/or VRF for the flow.

The algorithm used there is as follows— a) Determine the VPN domain (customer or RT) using the label stack (This is a heuristic).

b) Find all the routers that originate the source prefix of the flow in that domain (i.e., with the same RTs). These are called candidate routers.

c) At each candidate router, try to find a VRF for the determined VPN domain.

d) If VRF is found, try to see if a path lookup using that VRF to the destination prefix succeeds.

e) If VRF is not found, try to see if a path lookup to the destination prefix using a VPN route for that prefix within that VPN domain (Customer or RT) succeeds.

For the configuration above, this heuristic results in the routing gateway being elected as the ingress PE for the router. This happens because the source prefix was originated in the AS by the routing gateway, and the route to destination prefix (to PE1) goes via the ASBR router.

As a result of this, the link from routing gateway to ASBR showing a huge amount of traffic going through it, as the ingress PE for each and every VPN flow is found out to be the Routing gateway.

Process to Identify Ingress Router in an Inter-AS Option-C VPN Network

The problem is a result of the fact that we rely only on the originator, and not the next hop of a route to source prefix, to build a list of ingress PE candidates. But in cases like this, where a router originates routes that do not go through that router, we need to take next hop into account as well.

The proposed solution has two parts—

1) While building candidate list, verify that the originator of source prefix should have the next-hop address of the route configured on it. Otherwise, discard that originator.

2) As a follow up on the above solution, we can try to find the router that originated (in IGP, BGP or some other protocol like RSVP-TE) the next-hop address of the source prefix BGP route. And then use that router as a candidate.

Figure 3:
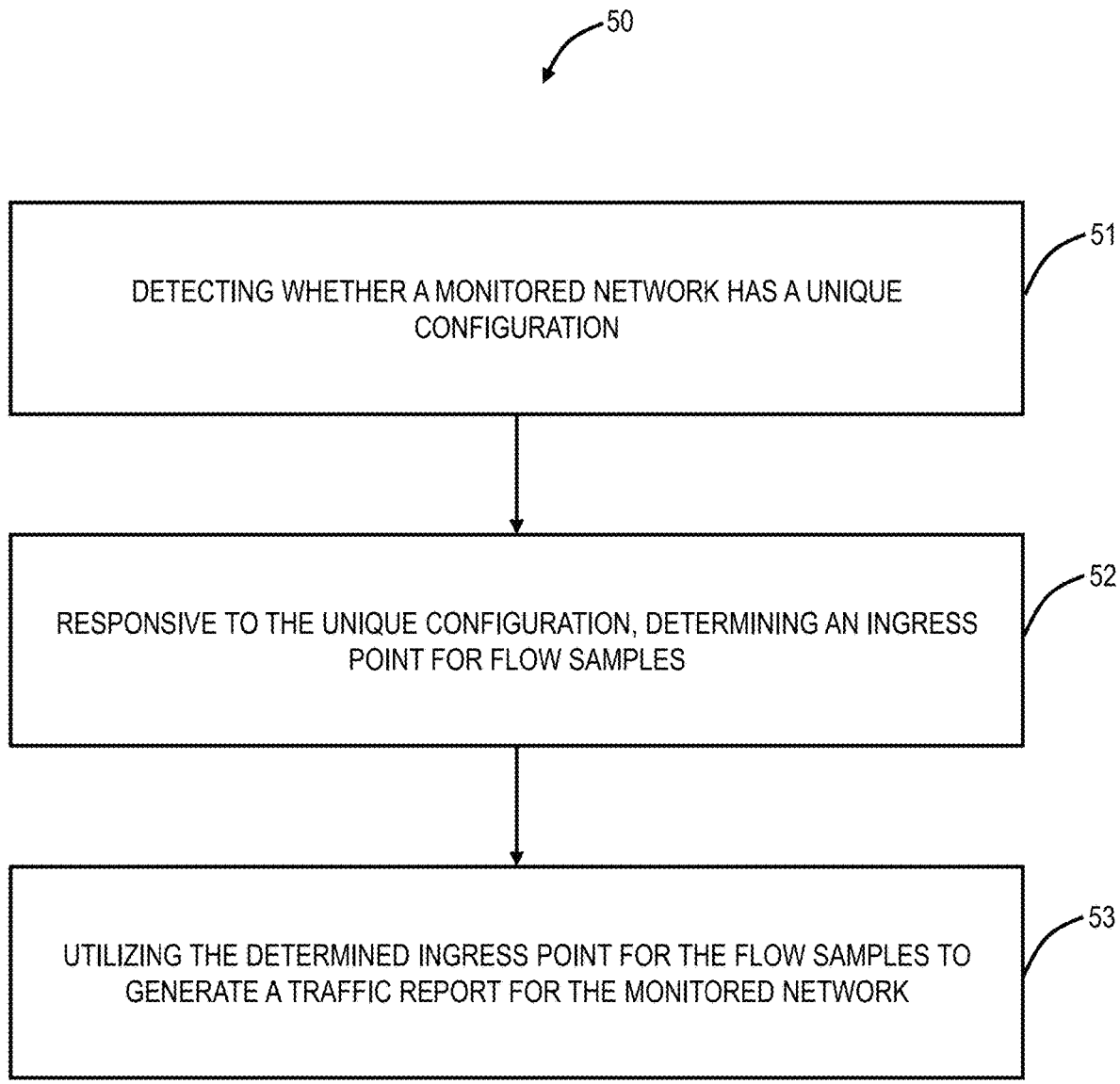
FIG. 3 is a process for identifying an ingress router in an inter-AS option-C VPN network.

FIG. 3 is a process 50 for identifying an ingress router in an inter-AS option-C VPN network. The process 50 can be implemented as a method having steps, via a processing device configured to execute the steps, via a non-transitory computer-readable medium having instructions that cause the processing device to execute the steps, and the like. For example, the process 50 can be implemented via the monitoring system 12.

The process 50 includes detecting whether a monitored network has a unique configuration (step 51); responsive to the unique configuration, determining an ingress point for flow samples (step 52); and utilizing the determined ingress point for the flow samples to generate a traffic report for the monitored network (step 53).

The unique configuration is an inter-Autonomous System (AS) option-C Virtual Private Network (VPN) network where control and data planes are asymmetric. The unique configuration includes some Layer 3 Virtual Private Network (VPN) (L3VPN) routes learned from an adjacent Autonomous System (AS) connected to the monitored network having an originator attribute that points to any of a Provider Edge (PE) node and routing gateway in the monitored network that is wrongly identified.

The detecting can be based on originators, including any of Provider Edge (PE) nodes and routing gateways, for some Layer 3 Virtual Private Network (VPN) (L3VPN) routes lacking Virtual routing and forwarding table (VRF) for corresponding services. The detecting can be based on some Layer 3 Virtual Private Network (VPN) (L3VPN) traffic entering a partially visible portion of the monitored network at an Autonomous System Border Router (ASBR).

The determining can include following Layer 3 Virtual Private Network (VPN) (L3VPN) routes in a reverse direction. The determining can include searching next-hops of Layer 3 Virtual Private Network (VPN) (L3VPN) routes within local prefixes advertised by protocols used to setup transport tunnels. This includes following the next-hop of L3VPN routes towards the traffic source in the L3VPN service, instead of trying to directly find its originator. The last node(s) where the next-hop leads to in the monitored AS (exit point) is identified as the ingress ASBR candidate(s). This also includes searching the next-hop of the L3VPN route within the local prefixes advertised by the protocols used to setup inter-AS PE transport tunnels (IGP or Labeled BGP), instead of performing the complete path lookup to next-hop.

The process 50 can include obtaining the flow samples from the monitored network. Of note, the traffic report is a traffic projection based on the flow samples. Without the process 50, the traffic report will show all of the inter-AS traffic as being at the ASBR. The process 50 can also include correlating a topology of the monitored network with paths for the flow samples.

Example Node

Figure 4:
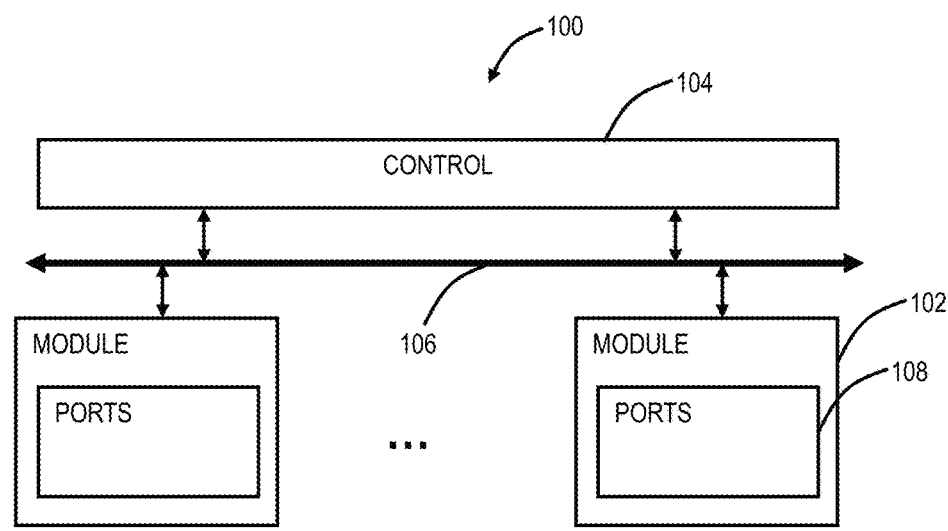
FIG. 4 is a block diagram of an example implementation of a node, such as for any of the nodes in the IP/MPLS network.

FIG. 4 is a block diagram of an example implementation of a node 100, such as for any of the nodes in the network 10. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 24 is meant to provide a functional view, and those of ordinary skill in the art will recognize actual hardware implementations may vary.

Example Processing Device

Figure 5:
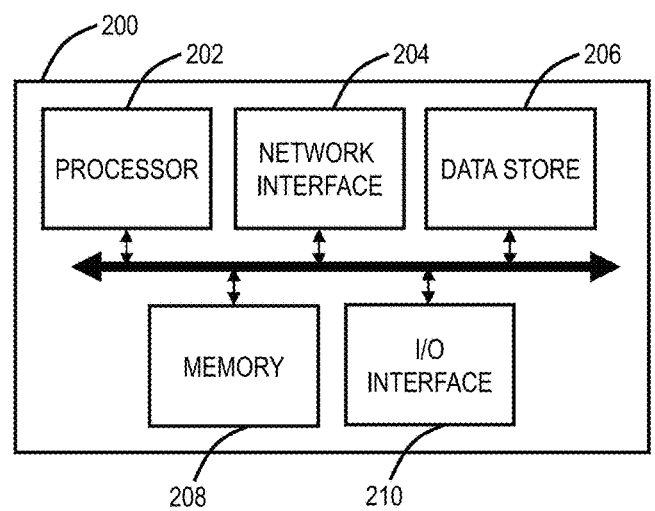
FIG. 5 is a block diagram of an example processing device, which can form the monitoring system.

FIG. 5 is a block diagram of an example processing device 200, which can form the monitoring system 12. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a processing device to perform steps of:
   detecting whether a monitored network has a unique configuration where there are multiple Autonomous Systems (AS) with only partial visibility for the monitored network and where control and data planes are asymmetric where a forwarding path is not the same as a path through which routes are exchanged from an AS that is not visible in the monitored network;
   responsive to the unique configuration, determining an ingress point for flow samples; and
   utilizing the determined ingress point for the flow samples to generate a traffic report for the monitored network,
   wherein the unique configuration is an inter-Autonomous System (AS) option-C Virtual Private Network (VPN) network where control and data planes are asymmetric.

2. The non-transitory computer-readable medium of claim 1, wherein the detecting is based on originators, including any of Provider Edge (PE) nodes and routing gateways, for some Layer 3 Virtual Private Network (VPN) (L3VPN) routes lacking Virtual routing and forwarding table (VRF) for corresponding services.

3. The non-transitory computer-readable medium of claim 1, wherein the determining includes following Layer 3 Virtual Private Network (VPN) (L3VPN) traffic in a reverse direction.

4. The non-transitory computer-readable medium of claim 1, wherein the determining includes searching next-hops of Layer 3 Virtual Private Network (VPN) (L3VPN) routes within local prefixes advertised by protocols used to setup transport tunnels.

5. The non-transitory computer-readable medium of claim 1, wherein the steps further include
   obtaining the flow samples from the monitored network.

6. The non-transitory computer-readable medium of claim 1, wherein the steps further include
   correlating a topology of the monitored network with paths for the flow samples.

7. The non-transitory computer-readable medium of claim 1, wherein the traffic report is a traffic projection based on the flow samples.

8. A non-transitory computer-readable medium having instructions stored thereon for programming a processing device to perform steps of:
   detecting whether a monitored network has a unique configuration where there are multiple Autonomous Systems (AS) with only partial visibility for the monitored network and where control and data planes are asymmetric where a forwarding path is not the same as a path through which routes are exchanged from an AS that is not visible in the monitored network;
   responsive to the unique configuration, determining an ingress point for flow samples; and
   utilizing the determined ingress point for the flow samples to generate a traffic report for the monitored network,
   wherein the detecting is based on some Layer 3 Virtual Private Network (VPN) (L3VPN) traffic entering the monitored network at an Autonomous System Border Router (ASBR).

9. The non-transitory computer-readable medium of claim 8, wherein the detecting is based on originators, including any of Provider Edge (PE) nodes and routing gateways, for some Layer 3 Virtual Private Network (VPN) (L3VPN) routes lacking Virtual routing and forwarding table (VRF) for corresponding services.

10. The non-transitory computer-readable medium of claim 8, wherein the determining includes following Layer 3 Virtual Private Network (VPN) (L3VPN) traffic in a reverse direction.

11. The non-transitory computer-readable medium of claim 8, wherein the determining includes searching next-hops of Layer 3 Virtual Private Network (VPN) (L3VPN) routes within local prefixes advertised by protocols used to setup transport tunnels.

12. The non-transitory computer-readable medium of claim 8, wherein the steps further include obtaining the flow samples from the monitored network.

13. The non-transitory computer-readable medium of claim 8, wherein the steps further include correlating a topology of the monitored network with paths for the flow samples.

14. The non-transitory computer-readable medium of claim 8, wherein the traffic report is a traffic projection based on the flow samples.

15. A non-transitory computer-readable medium having instructions stored thereon for programming a processing device to perform steps of:
   detecting whether a monitored network has a unique configuration where there are multiple Autonomous Systems (AS) with only partial visibility for the monitored network and where control and data planes are asymmetric where a forwarding path is not the same as a path through which routes are exchanged from an AS that is not visible in the monitored network;
   responsive to the unique configuration, determining an ingress point for flow samples; and
   utilizing the determined ingress point for the flow samples to generate a traffic report for the monitored network,
   wherein the unique configuration includes some Layer 3 Virtual Private Network (VPN) (L3VPN) routes learned from an adjacent Autonomous System (AS)

connected to the monitored network having an originator attribute that points to any of a Provider Edge (PE) node and routing gateway in the monitored network that is wrongly identified.

16. The non-transitory computer-readable medium of claim 15, wherein the detecting is based on originators, including any of Provider Edge (PE) nodes and routing gateways, for some Layer 3 Virtual Private Network (VPN) (L3VPN) routes lacking Virtual routing and forwarding table (VRF) for corresponding services.

17. The non-transitory computer-readable medium of claim 15, wherein the determining includes following Layer 3 Virtual Private Network (VPN) (L3VPN) traffic in a reverse direction.

18. The non-transitory computer-readable medium of claim 15, wherein the determining includes searching next-hops of Layer 3 Virtual Private Network (VPN) (L3VPN) routes within local prefixes advertised by protocols used to setup transport tunnels.

19. The non-transitory computer-readable medium of claim 15, wherein the steps further include
obtaining the flow samples from the monitored network.

* * * * *